(12) United States Patent
Zhang et al.

(10) Patent No.: US 12,191,505 B2
(45) Date of Patent: Jan. 7, 2025

(54) ROLL-TO-ROLL CONTINUOUS COATER FOR CCM PREPARATION, AND ROLL MATERIAL CONNECTION METHOD

(71) Applicant: DALIAN INSTITUTE OF CHEMICAL PHYSICS, CHINESE ACADEMY OF SCIENCES, Liaoning (CN)

(72) Inventors: Hongjie Zhang, Liaoning (CN); Jinkai Hao, Liaoning (CN); Zhigang Shao, Liaoning (CN)

(73) Assignee: DALIAN INSTITUTE OF CHEMICAL PHYSICS, CHINESE ACADEMY OF SCIENCES, Liaoning (CN)

( * ) Notice: Subject to any disclaimer, the term of this patent is extended or adjusted under 35 U.S.C. 154(b) by 26 days.

(21) Appl. No.: 18/256,938

(22) PCT Filed: Aug. 17, 2021

(86) PCT No.: PCT/CN2021/112978
§ 371 (c)(1),
(2) Date: Jun. 12, 2023

(87) PCT Pub. No.: WO2022/127158
PCT Pub. Date: Jun. 23, 2022

(65) Prior Publication Data
US 2024/0039004 A1 Feb. 1, 2024

(30) Foreign Application Priority Data
Dec. 14, 2020 (CN) .......................... 202011476893.9

(51) Int. Cl.
*H01M 4/88* (2006.01)
*B05C 5/02* (2006.01)
*B65H 23/18* (2006.01)

(52) U.S. Cl.
CPC ......... *H01M 4/8828* (2013.01); *B05C 5/0245* (2013.01); *B65H 23/1806* (2013.01); *H01M 4/881* (2013.01); *H01M 4/8882* (2013.01)

(58) Field of Classification Search
CPC .. H01M 4/8828; H01M 4/881; H01M 4/8882; B05C 5/0245; B65H 23/1806
See application file for complete search history.

(56) References Cited

U.S. PATENT DOCUMENTS

2018/0162668 A1* 6/2018 Hong .................. B65H 19/102

FOREIGN PATENT DOCUMENTS

| CN | 207713058 U | 8/2018 |
| CN | 207861573 U | 9/2018 |

(Continued)

*Primary Examiner* — Nathan T Leong
(74) *Attorney, Agent, or Firm* — NKL Law; Allen Xue

(57) ABSTRACT

A roll-to-roll continuous coater for CCM preparation, and a coiled material connection method are provided. The coater has a coiled material connection mechanism that includes an upper rack (2) and a lower rack (3). A vacuum suction plate I (2-3) provided with a driving device for achieving displacement and a vacuum suction plate II (3-1) provided with a solid glue spraying device (3-3) are respectively disposed on the bottom of the upper rack (2) and the top of the lower rack (3). An optical fiber sensor I (2-4) and an optical fiber sensor II (3-2) are respectively disposed in the vacuum suction plate I (2-3) and the vacuum suction plate II (3-1). A tension detection device (4) is disposed between the lower rack (3) and a driving roller assembly (1).

10 Claims, 5 Drawing Sheets

(56) References Cited

FOREIGN PATENT DOCUMENTS

| CN | 109532040 | * | 3/2019 |
| CN | 109532040 A | | 3/2019 |
| CN | 208960300 U | | 6/2019 |
| CN | 112599795 A | | 4/2021 |

* cited by examiner

ROLL-TO-ROLL CONTINUOUS COATER FOR CCM PREPARATION, AND ROLL MATERIAL CONNECTION METHOD

TECHNICAL FIELD

The present invention relates to the field of fuel cells, in particular to a roll-to-roll continuous coater for catalyst coated membrane (CCM) preparation and a coiled material joining method.

BACKGROUND

Proton exchange membrane fuel cell (PEMFC) has the advantages such us high power density, high energy conversion efficiency, startup in low temperature and environmental friendliness, which is widely used in aerospace, energy, transportation, military and other fields. As an extremely important component in proton exchange membrane fuel cells, membrane electrode consists of a proton exchange membrane, a catalytic layer and a diffusion layer. Common preparation process of the membrane electrode is to coat catalyst slurry on both sides of the proton exchange membrane to form two catalytic layers, then attach the diffusion layer to the two catalytic layers separately, and then obtain a membrane electrode with a "sandwich" structure through processes such as hot-pressing.

In order to improve the product production efficiency, more and more businesses choose the roll-to-roll continuous coater to coat the catalyst slurry on the proton exchange membrane. A set of mature roll-to-roll continuous coater in turn consists of a feeding area, a coating area, a transferring area, a drying area and a detecting area, with a length of up to tens of meters. The transferring area is composed of multiple sets of driving rollers, running through the entire coater. The driving roller includes an unwinding roller, a tensioning roller, a winding roller, etc. The proton exchange membrane coiled material to-be-coated is placed in the unwinding roller, and then is pulled to the winding roller. In this process, the proton exchange membrane is tensioned and wound between multiple sets of tensioning rollers to achieve the transfer through the rotation of the driving rollers.

The main steps for coating the catalyst slurry with a roll-to-roll continuous coater are as follows: firstly, the catalyst slurry is fed into the coating area through the mechanism in the feeding area, and the proton exchange membrane is coated with a coating die in the coating area to form a catalytic layer followed by drying in the drying area; then the coating quality, thickness and other indicators of the coated membrane are recorded and detected in the detection area; finally, the coated membrane is wound and stored with the winding roller.

During the above process, due to the coating area being disposed at the starting position, a section from the starting end of the proton exchange membrane to the unwinding roller is directly wound into the coiled material without coating, causing a waste. In addition, within a defined working time, a new coiled material to-be-coated need to be replaced on the unwinding roller after the proton exchange membrane to-be-coated is completely coated, and the new coiled material is pulled onto the winding roller again according to the aforementioned method, causing waste of the uncoated section once again.

Patent No. CN201811153053.1 discloses a TPU continuous coating production system and method, which uses a guide membrane, such as PET membrane, as an intermediate receiving membrane. The guide membrane is directly attached, by double-sided tape or glue, to two TPU base membranes for connecting them and forming a joint of two coiled material, that is, this patent directly connects two coiled materials in an adhesive manner. This adhesive manner is relatively simple and requires manual operation. For large roll-to-roll continuous coater, whose internal structure is complex and distribution of the driving rollers is dense, the adhesive joint manner is difficult to operate. In order to ensure the coating quality of proton exchange membrane, the high requirements for process of alignment and adhesive connection between two coiled materials increase the working pressure.

SUMMARY OF THE INVENTION

In order to solve the problems existing in the prior art, the present invention provides a roll-to-roll continuous coater for CCM preparation and a coiled material connection method, which can realize an automatic adhesive connection of two new coiled materials in the roll-to-roll continuous coater, achieve higher quality of alignment and adhesive connection, improve work efficiency, and reduce work pressure.

In order to achieve the aim of the above present invention, technical solutions adopted by the present invention are as follows: The present invention provides a roll-to-roll continuous coater for CCM preparation. The roll-to-roll continuous coater is internally provided with a Programmable Logic Controller (PLC) system, and includes an oven, an unwinding roller and a plurality of driving roller assemblies. Each set of the driving roller assembly is composed of a tensioning wheel and a floating wheel. The roll-to-roll continuous coater further includes a coiled material connection mechanism disposed between the unwinding roller and an entrance of the oven. The coiled material connection mechanism includes an upper rack and a lower rack. The upper rack is close to the unwinding roller, and the lower rack is close to the driving roller assemblies. A bottom of the upper rack is provided with a vacuum suction plate I for leveling and suctioning a proton exchange membrane, a top of the lower rack is provided with a vacuum suction plate II for leveling and suctioning a proton exchange membrane, and the size and shape of the vacuum suction plate I and the vacuum suction plate II are the same. The upper rack is internally provided with a driving device signal-connected to the PLC system circuit and controlling a movement of the vacuum suction plate I to attach to the vacuum suction plate II, and the lower rack is provided with a solid glue spraying device signal-connected to the PLC system circuit. The vacuum suction plate I and the vacuum suction plate II are respectively provided with an optical fiber sensor I and an optical fiber sensor II signal-connected to the PLC system circuit. A tension detection device, acting on the proton exchange membrane and signal-connected to the PLC system circuit, is disposed between the lower rack and the driving roller assembly.

The present invention is further set as that the coiled material connection mechanism includes two travel switches disposed above the lower stage and used for respectively contacting with two adjacent side walls of the vacuum adsorption plate I. When the vacuum suction plate I contacts with the travel switch, the vacuum suction plate I is located right above the vacuum suction plate II. The travel switch is signal-connected to the PLC system circuit.

The present invention is further set as that the optical fiber sensor I is located above a side, close to the driving roller assembly, of the optical fiber sensor II when the vacuum suction plate I is located right above the vacuum suction plate II, and a distance between the optical fiber sensor I and the optical fiber sensor II is 2 mm.

The present invention is further set as that the solid glue spraying device includes a nozzle perpendicular to the vacuum suction plate II. The nozzle is located between the optical fiber sensor I and the optical fiber sensor II when the vacuum suction plate I is located right above the vacuum adsorption plate II. The solid glue spraying device further includes a driving motor I, a driving screw I, a driving motor II, a transmission gearbox and a driving screw II. The driving motor I and driving screw I control the nozzle to slide in a straight line along the direction of X/Y axis of the vacuum suction plate II, and the driving motor II, transmission gearbox and driving screw II control the nozzle to slide in a straight line along the direction of Z axis of the vacuum suction plate.

The present invention is further set as that the tension detection device includes a rotating wheel acting a pressure on the proton exchange membrane. One end, away from the proton exchange membrane, of the rotating wheel is fixedly connected to a pressure spring. The tension detection device is internally provided with a pressure sensor disposed at one end, away from the rotating wheel, of the pressure spring.

The present invention is further set as that the method for connecting coiled materials by the roll-to-roll continuous coater includes the following steps:

S1. The PLC system receives a signal from the tension detection device when a roll of the coated proton exchange membrane on the unwinding roller is completely coated;

S2. The PLC system controls the driving roller assembly to continue operating, so that the remaining coated proton exchange membrane is transferred to the winding roller at a transfer speed of 1 m/s, and the PLC system controls the driving roller assembly to stop rotating after a signal from the optical fiber sensor II in the PLC system disappears, so that the tensioning wheel and the floating wheel tensions the coated proton exchange membrane;

S3. The PLC system controls the vacuum suction plate II for vacuum suction of the coated proton exchange membrane;

S4. Place a new coiled material onto the unwinding roller, and manually pull a starting end of the new coiled material onto the vacuum suction plate I until the PLC system receives a signal from the optical fiber sensor I;

S5. The PLC system controls the vacuum suction plate I for vacuum suction of the new coiled material;

S6. The PLC system controls the unwinding roller to rotate to wind the new coiled material at a transfer speed of 0.5 m/s until the signal from the optical fiber sensor I in the PLC system disappears, and then the unwinding roller stops rotating;

S7. The solid glue spraying device sprays a layer of high-temperature resistant glue onto the coated proton exchange membrane on the vacuum suction plate II through the nozzle;

S8. The driving device controls the vacuum suction plate I to horizontally move towards the vacuum suction plate II until the PLC system receives signals from the two travel switches, at this time, the vacuum suction plate I is located right above the vacuum suction plate II;

S9. The PLC system controls the driving device to lower the vacuum suction plate I to attach the new coiled material to the coated proton exchange membrane, forming a coiled body with a connection head.

The present invention is further set as that, in step S1, before the PLC system receives signal from the pressure sensor, power supplies of the upper rack and the lower rack are both in a power-off state, the vacuum suction plate I is far away from the driving roller assembly, and the vacuum suction plate II is located diagonally below the driving roller assembly and is not in contact with the tensioned proton exchange membrane.

The present invention is further set as that, in step S1, after receiving the signal from the pressure sensor, the PLC system controls the power supplies of the upper rack and the lower rack to be turned on, at this time, the optical fiber sensor II is in a signal state and the optical fiber sensor I is in an untransmitted signal state.

The present invention is further set as that, in step S7, a thickness of the high-temperature resistant glue is 20-40 μm and a width is 2 mm.

The present invention is further set as that, in step S9, the PLC system controls the driving roller assembly to drive the proton exchange membrane with a connection head to gradually tension and transfer the proton exchange membrane to the oven for drying 5-10 s, and then reversely transfer the proton exchange membrane to a coating area of the roll-to-roll coater, and a temperature of the oven is 55-70° C.

Compared with the prior art, the present invention has the following beneficial effects:

1. The coiled material connection mechanism of the present invention preliminary positions the coated proton exchange membrane and the new coiled material by suctioning the two through the vacuum suction plates II and I, then controls the precise positioning of the two on the vacuum suction plates II and I through the PLC system, the optical fiber sensors II and I, and then automatically sprays glue on the surface of the coated proton exchange membrane through the solid glue spraying device, finally completely attach the vacuum suction plate I to the vacuum suction plate II through the PLC system controlling the driving device and the auxiliary control of the travel switches, so as to realize the connection between the coated proton exchange membrane and the new coiled material. Connection process is achieved through the above automatically device and process, and a higher quality of alignment and connection is achieved, effectively improving work efficiency and reducing work pressure.

2. The connection mechanism is further provided with a tension detection device, which transfers the change of the tension of the proton exchange membrane to the pressure sensor, so as to facilitate the PLC system to quickly receive signals and make corresponding program changes, preparing for the connection of the new coiled material, and further reflecting the high efficiency and convenience of the automatic program.

3. Positioning of the optical-fiber sensors I and II defines a width of the connection head between a coated proton exchange membrane and a new coiled material, and a size of the connection head is accurately controlled, having an intelligent control ability.

4. Before the connection process begins, the power supplies of the upper rack and the lower rack are both in a power-off state, the vacuum suction plate I is far away from the driving roller assembly and the vacuum suction plate II is located diagonally below the driving roller assembly and is not in contact with the tensioned proton exchange membrane, ensuring that the mechanisms such as the upper rack and the lower rack will not interfere with normal transmission and coating of the proton exchange membrane.

5. After the connection between a coated proton exchange membrane and a new coiled material is completed, the proton exchange membrane enters the oven for drying 5-10 s to cure the glue, ensuring the tight connection between the two. After the curing is completed, the proton exchange membrane is continued to be transferred to the original place to facilitate the coating of the new coiled material in the coating area, reducing waste.

DETAILED DESCRIPTION OF DRAWINGS

Figure 1:
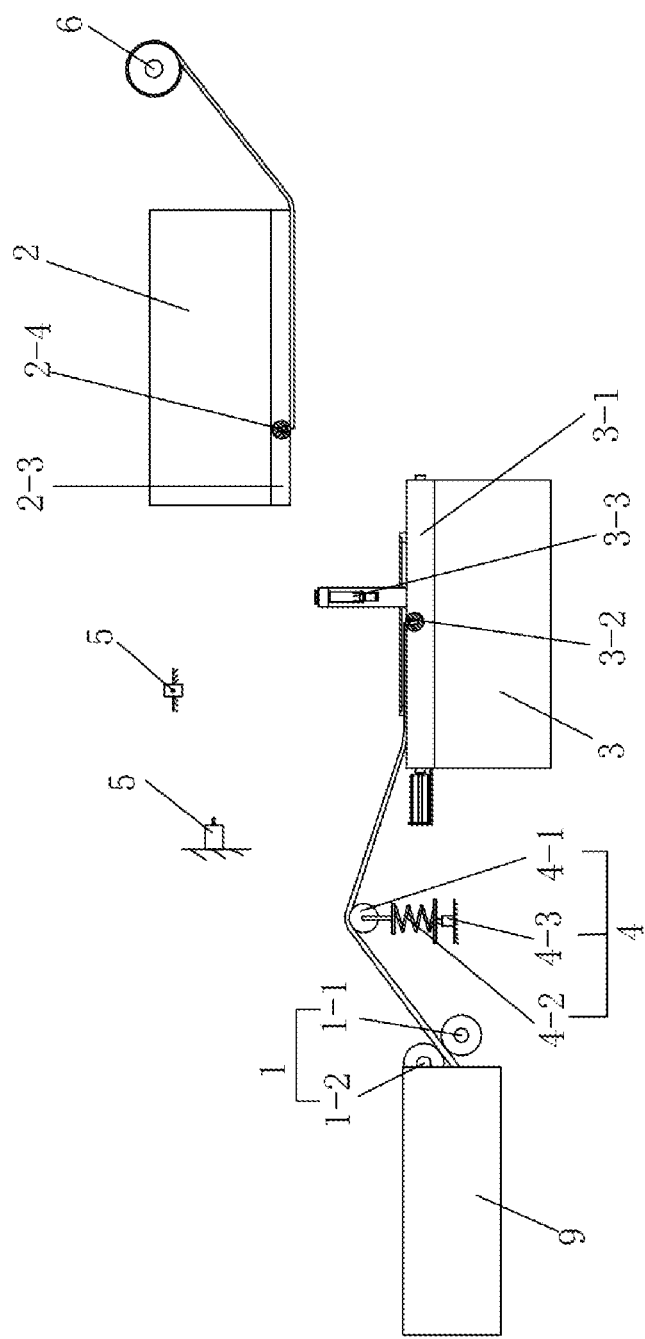
FIG. 1 shows a principle schematic diagram of the coiled material connection mechanism of the roll-to-roll continuous coater in the present invention.

In the figures: 1. driving roller assembly, 1-1. tensioning wheel, 1-2. floating wheel, 2. upper rack, 2-1. X/Y axis driving sliding table, 2-2. Z axis driving sliding table, 2-3. vacuum suction plate I, 2-4. optical fiber sensor I, 3. lower rack, 3-1. vacuum suction plate II, 3-2. optical fiber sensor II, 3-3. solid glue spraying device, 3-3-1. driving motor I, 3-3-2. driving screw I, 3-3-3. driving motor II, 3-3-4. driving screw II, 3-3-5. nozzle, 3-3-6. transmission gearbox, 4. tension detection device, 4-1. rotating wheel, 4-2. pressure spring, 4-3. pressure sensor, 5. travel switch, 6. unwinding roller, 7. coated proton exchange membrane, 8. new coiled material, 9. oven.

DETAILED DESCRIPTION OF PREFERRED EMBODIMENTS

The following is further an illustration of the present invention in connection with specific embodiments below, but does not limit the present invention in any way.

Embodiment 1

A roll-to-roll continuous coater for CCM preparation is internally provided with a PLC system and a plurality of driving roller assemblies 1 running through the roll-to-roll coater. Each set of the driving roller assembly 1 is composed of a tensioning wheel 1-1 and a floating wheel 1-2. The roll-to-roll continuous coater further includes a coating area located at the transfer beginning end in a transfer direction of the driving roller assembly. The coating area includes an unwinding roller 6 for mounting the proton exchange membrane coiled material. The coiled material is tensioned and installed on the driving roller assembly after it is placed on the unwinding roller 6 to form a transfer from beginning to end in the roll-to-roll coater. In addition, the roll-to-roll continuous coater includes an oven 9 located at the rear station of the coating area in the transfer direction. The coiled material connection mechanism of the present invention is disposed between the unwinding roll 6 and the entrance of the oven 9.

Figure 4:
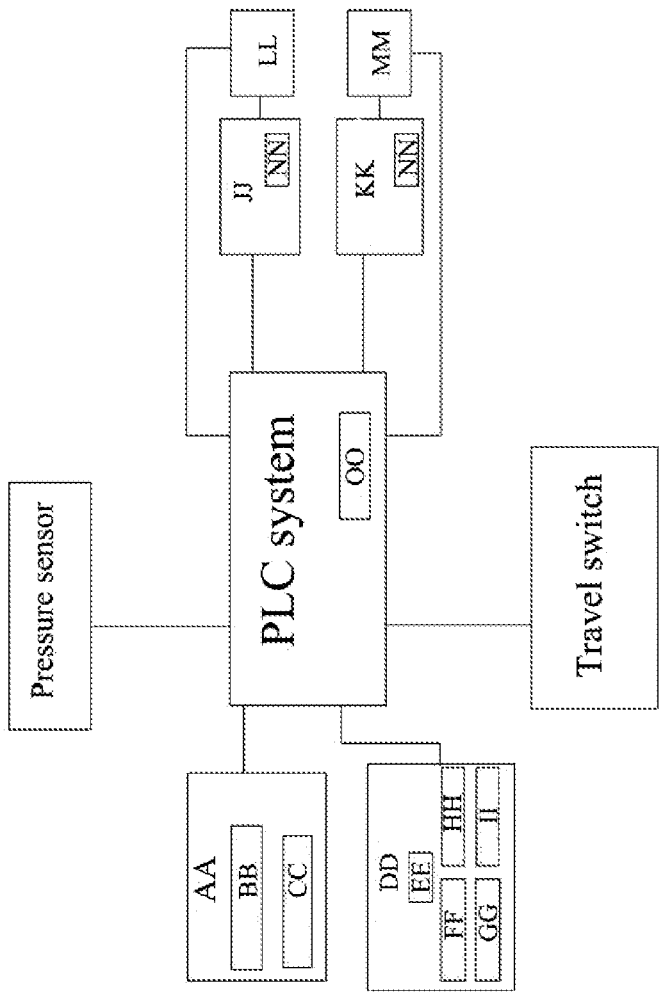
FIG. 4 shows a system connection schematic diagram of the coiled material connection mechanism of the roll-to-roll continuous coater in the present invention.

As shown in FIGS. 1 and 4, the coiled material connection mechanism includes an upper rack 2 relatively close to the unwinding roller 6 and a lower rack 3 relatively close to a set of driving roller assembly 1. The bottom of the upper rack 2 is provided with a vacuum suction plate I 2-3 for leveling and suctioning a proton exchange membrane, and the top of the lower rack 3 is provided with a vacuum suction plate II 3-1 for leveling and suctioning of the proton exchange membrane.

The vacuum suction plate I 2-3 and the vacuum suction plate II 3-1 are metal plates with a plurality of suction holes, and each of the metal plates is connected to a fan through a gas pipe. The fan operates to vacuum the interior of metal plate to achieve vacuum suction. The shape and size of the vacuum suction plate I 2-3 and the vacuum suction plate II 3-1 are the same.

Figure 2:
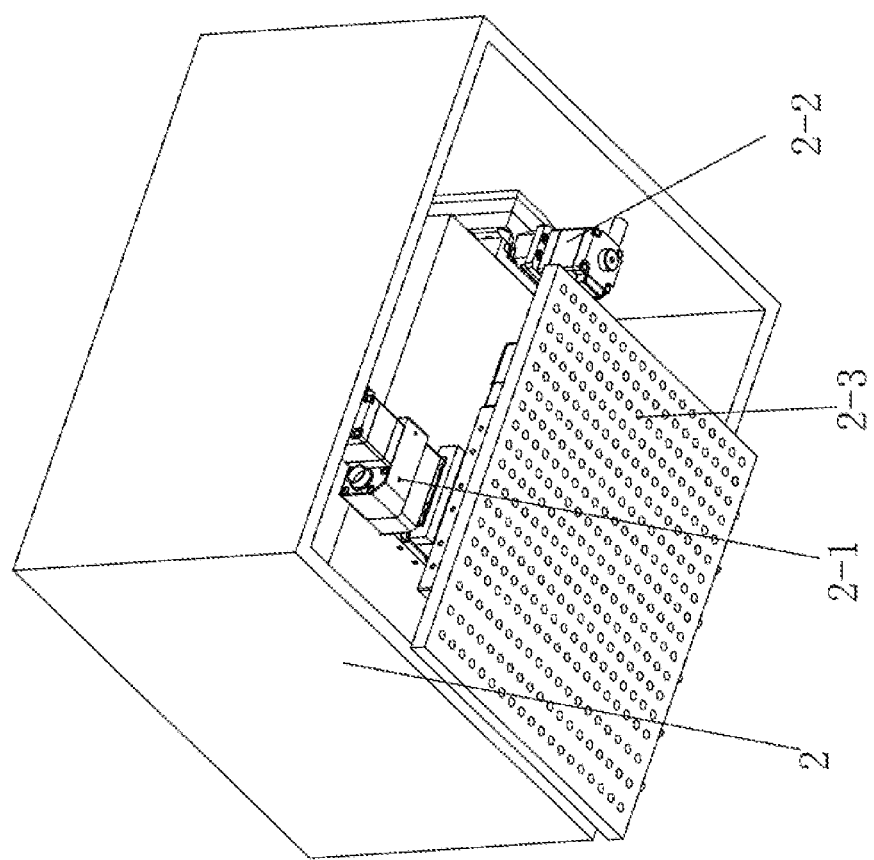
FIG. 2 shows a structural schematic diagram of various mechanisms of the upper rack.

As shown in FIGS. 2 and 4, the upper rack 2 is also internally provided with a driving device in signal-connected to a PLC system circuit and controlling a displacement of the vacuum suction plate I 2-3 to attach to the vacuum suction plate II 3-1. The driving device includes an X/Y axis driving sliding table and a Z axis driving sliding table, which are installed with a driving motor, that is, the driving sliding tables are electrically driven by driving motors to realize linear sliding of the vacuum suction plate I 2-3 in X, Y and Z directions.

Figure 3:
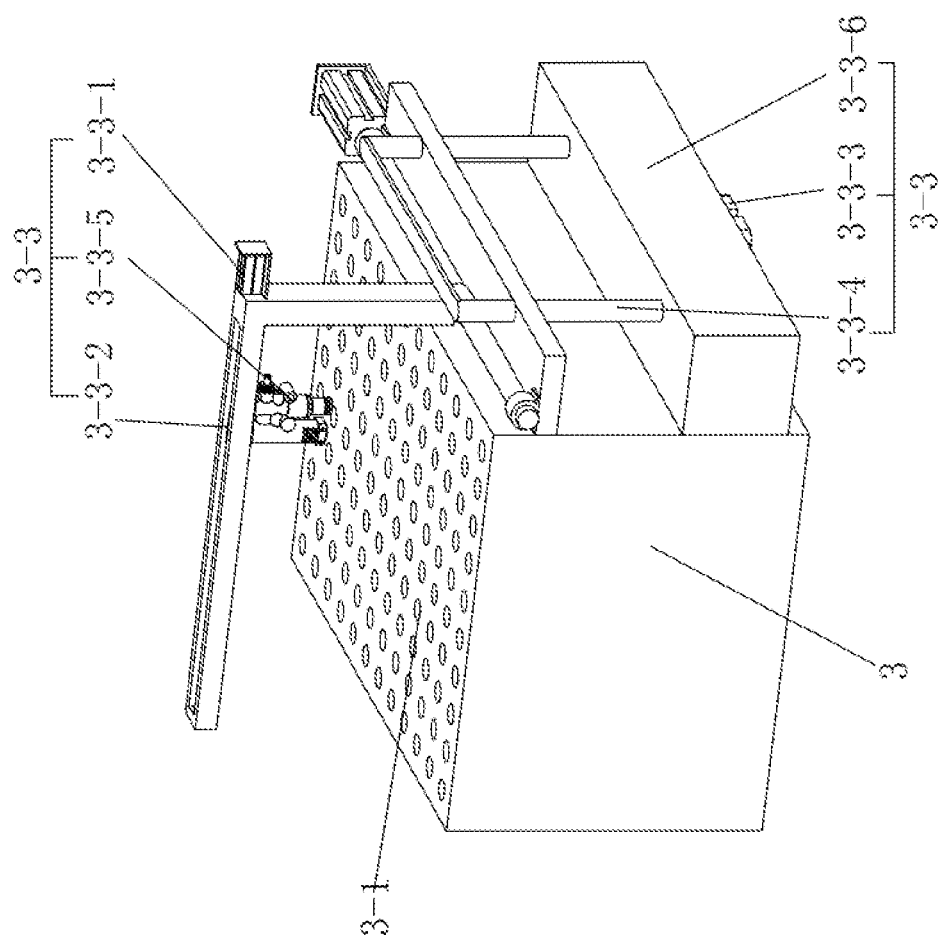
FIG. 3 shows a structural schematic diagram of various mechanisms of the lower rack.

As shown in FIG. 1, the lower rack 3 is a fixed mechanism that cannot displace, and is disposed diagonally below a set of driving roller assembly 1. As shown in FIGS. 1, 3 and 4, a solid glue spraying device 3-3 in signal-connected to the PLC system circuit is disposed on the lower rack 3. The solid glue spraying device 3-3 includes a nozzle 3-3-5 for spraying a solid glue, a driving motor I 3-3-1 and a driving screw I 3-3-2 for controlling the nozzle 3-3-5 to slide in a straight line along a width direction of the vacuum suction plate II 3-1, and a driving motor II 3-3-3, a transmission gearbox 3-3-6 and a driving screw II 3-3-4 controlling the nozzle 3-3-5 to slide in a straight line along a height direction of the vacuum suction plate.

In the roll-to-roll continuous coater, as shown in FIG. 1, the upper rack 2 is located away from the driving roller assembly 1, and the lower rack 3 is disposed diagonally below the driving roller assembly 1. Both racks avoid contact with the proton exchange membrane in a tensioned state. Before the connection mechanism operates, all the mechanisms on the upper rack 2 and the lower rack 3 are in a power-off state.

Figure 5:
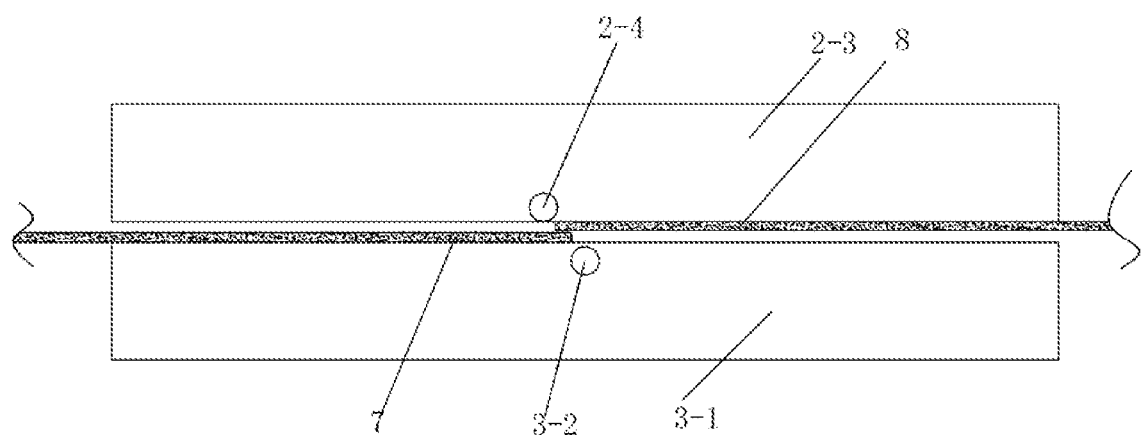
FIG. 5 shows a schematic diagram of the connection between a new coiled material and a coated proton exchange membrane when the vacuum suction plate I is located right above the vacuum suction plate II, i.e. a schematic diagram of a position relationship between the optical fiber sensors I and II in this state.

In the embodiment, as shown in FIGS. 1 and 4, an optical fiber sensor I 2-4 in signal-connected to the PLC system circuit is disposed in the vacuum suction plate I 2-3 and an optical fiber sensor II 3-2 in signal-connected to the PLC system circuit is disposed in the vacuum suction plate II 3-1. The optical fiber sensor II 3-2 is disposed at the center of the vacuum suction plate II 3-1, and the optical fiber sensor I 2-4 is located on the side, close to the driving roller assembly 1, of the optical fiber sensor II 3-2 when the vacuum suction plate I 2-3 is displaced, under the action of the driving device, to be right above the vacuum suction plate II 3-1. At this time, the distance between the optical fiber sensor I 2-4 and the optical fiber sensor II 3-2 is 2 mm, as shown in FIG. 5. At the same time, the nozzle 3-3-5 of the solid glue spraying device 3-3 is located between the optical fiber sensor I 2-4 and the optical fiber sensor II 3-2, facilitating the spraying of the nozzle 3-3-5 at a determined position. That is, if both the vacuum suction plate I 2-3 and the vacuum suction plate II 3-1 are suctioned with proton exchange membrane at this time, there is a 2 mm superimposed region between the two proton exchange membranes, i.e. the connection head. The nozzle 3-3-5 between the optical fiber sensor I 2-4 and the optical fiber sensor II 3-2 sprays solid glue to the superimposed region of the proton exchange membrane on the vacuum suction plate II 3-1 under the action of the solid glue spraying device 3-3, so that the two proton exchange membranes are adhesive connected.

As shown in FIG. 1, in order to ensure that the above vacuum suction plate I 2-3 is accurately displaced to right above the vacuum suction plate II 3-1 under the action of the driving device, the coiled material connection mechanism further includes two travel switches 5 disposed above the lower rack 3 and used for respectively contacting with two adjacent side walls of the vacuum suction plate I 2-3. The travel switches 5 are also in signal-connected to the PLC system circuit, that is, a signal is triggered by means of the contact between the vacuum suction plate I 2-3 and the two travel switches 5, and the displacement motion of the driving device is stopped after the PLC system receives the signal from the travel switch 5, at this time, the vacuum suction plate I 2-3 is located right above the vacuum adsorption plate II 3-1.

In the embodiment, as shown in FIG. 1, a tension detection device, in signal-connected to the PLC system circuit and acting on the proton exchange membrane 4, is disposed between the lower rack 3 and the driving roller assembly 1. The tension detection device 4 includes a rotating wheel 4-1 acting a pressure on the proton exchange membrane. One end, away from the proton exchange membrane, of the rotating wheel 4-1 is fixedly connected to a pressure spring 4-2. One end, away from the rotating wheel 4-1, of the pressure spring 4-2 is provided with a pressure sensor 4-3 in signal-connected to the PLC system circuit.

A connection method using the above connection mechanism uses the following steps:

S1. During the normal coating operation of the roll-to-roll continuous coater, the upper rack 2 and the lower rack 3 located between the oven 9 and the unwinding roll 6 are in a power-off state, the vacuum suction plate I 2-3 is located away from the driving roller assembly 1, the vacuum suction plate II 3-1 is located diagonally below the driving roller assembly 1 and is not in contact with the proton exchange membrane in a tensioned state. When a coiled material of the coated proton exchange membrane 7 on the unwinding roller 6 is used up, the tail of the coiled material is separated from the unwinding roller 6, and the tension of a section of the proton exchange membrane between the unwinding roller 6 and the driving roller assembly 1 adjacent to the unwinding roller 6 disappears, so that the section thereof naturally hangs, and part of which is covered on the surface of the vacuum suction plate II 3-1. Meanwhile, the rotating wheel 4-1 acting on the coated proton exchange membrane 7 transmits the changed tension to the pressure sensor 4-3, and the pressure sensor 4-3 sends a signal to the PLC system.

S2. After receiving the signal from the pressure sensor 4-3, the PLC system controls mechanisms on the upper rack 2 and the lower rack 3 to be power-on. At this time, since the coated proton exchange membrane 7 naturally hangs on the surface of the vacuum suction plate II 3-1 and covers the optical fiber sensor II 3-2, so that a signal from the optical fiber sensor II 3-2 is displayed on the display screen of the PLC system. Meanwhile, since the vacuum suction plate I 2-3 is still located away from the driving roller assembly 1 and no proton exchange membrane contacts it, the optical fiber sensor I 2-4 is in a no signal state.

S3. The PLC system controls the driving roller assembly 1 to continue operating to slowly transfer the remaining coated proton exchange membrane 7 to the driving roller assembly 1 at a transfer speed of 1 m/s. When the tail of the coated coating exchange membrane is transferred to the vacuum suction plate II 3-1, the proton exchange membrane is separated from the optical fiber sensor II 3-2 during the continuous transfer process, and the PLC system controls the driving roller assembly 1 to stop rotating once the signal from the optical fiber sensor II 3-2 disappears in the display screen of the PLC system, so that the tensioning roller and the floating roller tensions the coated proton exchange membrane 7. At this time, the tail of the coated proton exchange membrane 7 is located at a side, close to the driving roller assembly 1, of the optical fiber sensor II 3-2.

S4. The PLC system controls the vacuum suction plate II 3-2 for vacuum suction of the coated proton exchange membrane, at this time, the coated proton exchange membrane can be smoothly suctioned on the surface of vacuum suction plate II 3-1 through manual operation.

S5. A new coiled material 8 is placed onto the unwinding roller 6, and the starting end of the new coiled material 8 is manually pulled to the vacuum suction plate 2-3. In order to ensure the flatness of the new coiled material on the vacuum suction plate I 2-3, the vacuum suction plate I 2-3 can be controlled to move to a position parallel to the unwinding roller 6 through the driving device in advance. The new coiled material 8 is manually pulled until the PLC system displays a signal received from the optical fiber sensor I 2-4, at this time, the new coiled material 8 covers the optical fiber sensor I 2-4 on the vacuum suction plate I 2-3.

S6. The PLC system controls the vacuum suction plate I 2-3 for vacuum suction of the new coiled material 8, realizing the positioning of the new coiled material 8 on the vacuum suction plate I 2-3.

S7. the PLC system controls the unwinding roller 6 to rotate to slowly wind the new coiled material 8 at a transfer speed of 0.5 m/s until the signal from the optical fiber sensor I 2-4 on the display screen of the PLC system disappears, that is, the PLC system controls the unwinding roller 6 to stop rotating when the optical fiber sensor I 2-4 is exposed outside again.

S8. The PLC system controls the nozzle 3-3-5 in the solid glue spraying device 3-3 to spray a layer of high-temperature resistant glue onto the coated proton exchange membrane on the vacuum suction plate II 3-1 with a thickness of 30 μm and a width of 2 mm.

S9. the driving device controls the vacuum suction plate I 2-3 to horizontally move in X direction and Y direction towards the vacuum suction plate II 3-1 until the PLC system receives signals from the two travel switches 5, at this time, the vacuum suction plate I 2-3 is located right above the vacuum suction plate II 3-1, and there is a 2 mm superimposed region between the new coiled material 8 suctioned by the vacuum suction plate I 2-3 and the coated proton exchange membrane on the vacuum suction plate II 3-1, and the superimposed region has been sprayed with solid glue in step S8.

S10. The PLC system controls the driving device to lower the vacuum suction plate I 2-3, so that the new coiled material 8 is attached to the coated proton exchange membrane 7, forming a coiled body with a connection head. After completion of the connection, both the vacuum suction plate I 2-3 and the vacuum suction plate II 3-1 stop the suction effect on the proton exchange membrane, and the vacuum suction plate I 2-3 moves to the original position away from the driving roller assembly 1.

S11. The PLC system controls the driving roller assembly 1 to drive the coiled material body with a connection head to be gradually tensioned and transferred to the oven 9 of a temperature of 60° C. for drying for 8 s, so as to ensure the rapid curing of the solid glue, so that the coated proton exchange membrane 7 and the new coiled material 8 are tightly adhesive connected at the superimposed region, and then the connected proton exchange membrane are reversely transferred to the coating area to coat the coiled material body from the starting end.

For those skilled in the art, without departing from the scope of the technical solution of the present invention, many possible changes and modifications can be made to the technical solution of the present invention by using the technical contents disclosed above, or modified into equivalent embodiments with equivalent changes. Therefore, any simple modification, equivalent change and modification made to the above embodiments according to the technical essence of the present invention without departing from the technical solution of the present invention shall still belong to the protection scope of the technical solution of the present invention.

The invention claimed is:

1. A roll-to-roll continuous coater for CCM preparation, comprising a PLC system, an oven (9), an unwinding roller (6) and a plurality of driving roller assemblies (1), each set of the driving roller assembly (1) being composed of a tensioning wheel (1-1) and a floating wheel (1-2), wherein the roll-to-roll continuous coater further comprises a coiled material connection mechanism disposed between the unwinding roller (6) and an entrance of the oven (9), wherein the coiled material connection mechanism comprises an upper rack (2) and a lower rack (3), the upper rack (2) is close to the unwinding roller (6) and the lower rack (3) is close to a set of driving roller assembly, a bottom of the upper rack (2) is provided with a vacuum suction plate I (2-3) for leveling and suctioning a proton exchange membrane, a top of the lower rack (3) is provided with a vacuum suction plate II (3-1) for leveling and suctioning the proton exchange membrane, and the vacuum suction plate I (2-3) and the vacuum suction plate II (3-1) have a same size and a same shape; a driving device is disposed in the upper rack (2), wherein the driving device is signal-connected to the PLC system circuit and controls a movement of the vacuum suction plate I (2-3) to attach to the vacuum suction plate II (3-1), and the lower rack (3) is provided with a solid glue spraying device (3-3) signal-connected to the PLC system circuit; an optical fiber sensor I (2-4) signal-connected to the PLC system circuit is disposed in the vacuum suction plate I (2-3) and an optical fiber sensor II (3-2) signal-connected to the PLC system circuit is disposed in the vacuum suction plate II (3-1); and a tension detection device (4) is disposed between the lower rack (3) and the driving roller assembly (1), wherein the tension detection device (4) acting on the proton exchange membrane is signal-connected to the PLC system circuit.

2. The roll-to-roll continuous coater for CCM preparation according to claim 1, wherein the coiled material connection mechanism further comprises two travel switches (5) disposed above the lower rack (3) and used for respectively contacting with two adjacent side walls of the vacuum adsorption plate I (2-3), when the vacuum suction plate I (2-3) contacts with the travel switch (5), the vacuum suction plate I (2-3) is located right above the vacuum suction plate II (3-1), and the travel switch (5) is signal-connected to the PLC system circuit.

3. The roll-to-roll continuous coater for CCM preparation according to claim 2, wherein the optical fiber sensor I (2-4) is located above a side, close to the driving roller assembly (1), of the optical fiber sensor II (3-2) when the vacuum suction plate I (2-3) is located right above the vacuum suction plate II (3-1), and a distance between the optical fiber sensor I (2-4) and the optical fiber sensor II (3-2) is 2 mm.

4. The roll-to-roll continuous coater for CCM preparation according to claim 3, wherein the solid glue spraying device (3-3) comprises a nozzle (3-3-5) perpendicular to the vacuum suction plate II (3-1), the nozzle (3-3-5) is located between the optical fiber sensor I (2-4) and the optical fiber sensor II (3-2) when the vacuum suction plate I (2-3) is located right above the vacuum suction plate II (3-1), and the solid glue spraying device (3-3) further comprises a driving motor I (3-3-1), a driving screw I (3-3-2), a driving motor II (3-3-3), a transmission gearbox (3-3-6) and a driving screw II (3-3-4), wherein the driving motor I (3-3-1) and the driving screw I (3-3-2) control the nozzle (3-3-5) to slide in a straight line along a direction of X/Y axis of the vacuum suction plate II (3-1), and the driving motor II (3-3-3), the transmission gearbox (3-3-6) and the driving screw II (3-3-4) control the nozzle (3-3-5) to slide in a straight line along a direction of Z axis of the vacuum suction plate.

5. The roll-to-roll continuous coater for CCM preparation according to claim 1, wherein the tension detection device (4) comprises a rotating wheel (4-1) acting a pressure on the proton exchange membrane, and one end, away from the proton exchange membrane, of the rotating wheel (4-1) is fixedly connected to a pressure spring (4-2), a pressure sensor (4-3) is disposed in the tension detection device (4) and is disposed at one end, away from the rotating wheel (4-1), of the pressure spring (4-2).

6. A method for connecting coiled materials by the roll-to-roll continuous coater according to claim 1, comprising the following steps of:

S1, the PLC system receiving a signal from the tension detection device when a roll of the coated proton exchange membrane (7) on the unwinding roller (6) is completely coated;

S2, the PLC system controlling the driving roller assembly (1) to continue operating and transfer the remaining coated proton exchange membrane (7) to the winding roller at a transfer speed of 1 m/s, and the PLC system controlling the driving roller assembly (1) to stop rotating after a signal from the optical fiber sensor II (3-2) in the PLC system disappears, so that the tensioning wheel (1-1) and the floating wheel (1-2) tensions the coated proton exchange membrane (7);

S3, the PLC system controlling the vacuum suction plate II (3-1) for vacuum suction of the coated proton exchange membrane (7);

S4, placing a new coiled material (8) onto the unwinding roller (6), and manually pulling a starting end of the new coiled material (8) onto the vacuum suction plate I (2-3) until the PLC system receives a signal from the optical fiber sensor I (2-4);

S5, the PLC system controlling the vacuum suction plate I (2-3) for vacuum suction of the new coiled material (8);

S6, the PLC system controlling the unwinding roller (6) to rotate to wind the new coiled material (8) at a transfer speed of 0.5 m/s until the signal from the optical fiber sensor I (2-4) in the PLC system disappears, and then the unwinding roller (6) stopping rotating;

S7, the solid glue spraying device (3-3) spraying a layer of high-temperature resistant glue onto the coated proton exchange membrane (7) on the vacuum suction plate II (3-1) through the nozzle (3-3-5);

S8, the driving device controlling the vacuum suction plate I (2-3) to horizontally move towards the vacuum suction plate II (3-1) until the PLC system receives signals from the two travel switches (5), at this time, the vacuum suction plate I (2-3) being located right above the vacuum suction plate II (3-1); and S9, the PLC system controlling the driving device to lower the vacuum suction plate I (2-3) to attach the new coiled material (8) to the coated proton exchange membrane (7), forming a coiled body with a connection head.

7. The method for connecting coiled materials by the roll-to-roll continuous coater according to claim 6, wherein in step S1, before the PLC system receives signal from the pressure sensor (4-3), power supplies of the upper rack (2) and the lower rack (3) are both in a power-off state, the vacuum suction plate I (2-3) is far away from the driving roller assembly (1), and the vacuum suction plate II (3-1) is located diagonally below the driving roller assembly (1) and is not in contact with the tensioned proton exchange membrane.

8. The method for connecting coiled materials by the roll-to-roll continuous coater according to claim 7, wherein in step S1, after receiving the signal from the pressure sensor (4-3), the PLC system controls the power supplies of the upper rack (2) and the lower rack (3) to be turned on, at this time, the optical fiber sensor II (3-2) is in a signal state, and the optical fiber sensor I (2-4) is in an untransmitted signal state.

9. The method for connecting coiled materials by the roll-to-roll continuous coater according to claim 6, wherein in step S7, a thickness of the high-temperature resistant glue is 20-40 μm and a width is 2 mm.

10. The method for connecting coiled materials by the roll-to-roll continuous coater according to claim 6, wherein in step S9, the PLC system controls the driving roller assembly to drive the proton exchange membrane with a connection head to gradually tension and transfer the proton exchange membrane to the oven (9) for drying for 5-10 s, and then reversely transfer the proton exchange membrane to a coating area of the roll-to-roll coater, and a temperature of the oven is 55-70° C.

\* \* \* \* \*